May 9, 1933.   R. D. GREEN ET AL   1,908,600
ATTACHMENT FOR WIRE ROPES AND METHOD OF MAKING THE SAME
Filed Feb. 24, 1930
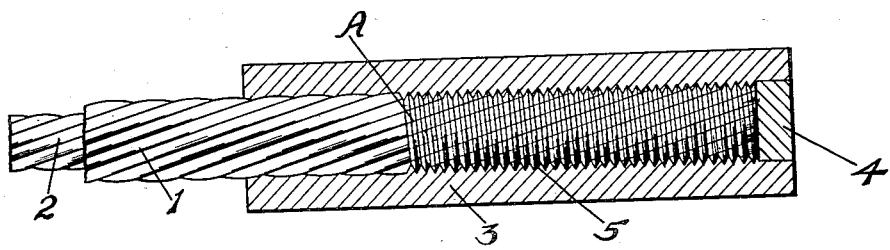
Inventors
Richard Duane Green and
Archibald J. Morgan
By their Attorneys
Philipp Sawyer Rice & Kennedy Patented May 9, 1933

1,908,600

UNITED STATES PATENT OFFICE

RICHARD DUANE GREEN AND ARCHIBALD J. MORGAN, OF TRENTON, NEW JERSEY, ASSIGNORS TO JOHN A. ROEBLING'S SONS COMPANY, OF TRENTON, NEW JERSEY, A CORPORATION OF NEW JERSEY

ATTACHMENT FOR WIRE ROPES AND METHOD OF MAKING THE SAME

Application filed February 24, 1930. Serial No. 430,923.

This invention relates to a method of attaching terminal devices of various kinds, such as eyes, hooks, electrical connectors, and other elements commonly used therewith, to cables or wire ropes and to an article produced thereby.

Attachments have been made in various ways as by serving, clamping and socketing, and somewhat by loosely fitting a sleeve to the rope and closing the sleeve down upon the rope by swaging or drawing until the material of the sleeve flows into the rope grooves.

This latter method has proved satisfactory and secured a quite efficient anchoring of the attachment when applied to ropes comprising a single layer of strands or wires laid about a core, but is not efficient when applied to ropes comprising two or more layers of strands or wires, especially when the layers are all the same lay, as it has been found that the inner layer or layers slide longitudinally or helically resulting in material loss in the strength of the rope and attachment.

The object of the present invention is to overcome this objection by providing an anchorage for a wire rope attachment and method of producing the same, which shall effectively prevent longitudinal or helical movement of the inner layer or layers of strands or wires forming the rope, and develop the full strength of the rope and attachment by causing the rope components to work in unison.

In the accompanying drawing forming a part of this specification, there is shown, by way of illustration, a longitudinal view, partly in section, of an attachment, embodying the invention in its preferred form, and this construction will now be described in detail and the features forming the invention then pointed out in the claims.

Referring to the drawing, A indicates, generally, the end of a multi-layer wire rope of a conventional type, shown for purpose of illustration, as consisting of an exterior layer of wires 1 and an interior layer of wires 2 laid about a core (not shown). As is usual in this type of attachment, an attachment sleeve 3 is compressed down upon the rope A.

In accordance with the present invention, holding means is provided for securing the rope components together to cause the inner layer or layers of wires to work in unison with the exterior layer.

This holding means may advantageously comprise welding a portion of the rope end, as shown at 4, so that the wire components are securely fastened together into a substantially homogeneous mass, wherein the metal of each wire or strand is present in the mass, but its identity is lost.

As a further aid in securing a strong union between the parts, the outside of the exterior layer of wires 1 is provided with shear lugs 5 in any suitable manner, as by serrating, grooving or threading, so that the material of the attachment sleeve 3 flows not only into the grooves of the rope A but also into the depressions between the shear lugs 5, thus firmly and positively gripping the rope.

This attachment and method may be used with advantage on composite multi-layer rope made of strands of high tensile strength strands, either ferrous or non-ferrous, and can be used with good results on ropes of hard steel or high tensile strength wire.

It will be understood that the invention is not to be limited to the form shown by way of illustration, as this may be modified within the invention as defined by the claims. It will be understood, also, that the term shear lugs herein is intended to cover one or more shear lugs, as in some cases only a single shear lug may be used.

What is claimed is:—

1. The method of securing attachments to wire ropes having two or more layers of strands or wires which comprises securing the layers of strands or wires together to cause the layers of strands or wires to work in unison in sustaining strains on the attachment, enclosing the rope in an attachment sleeve, and compressing said sleeve to cause the material thereof to flow into the rope grooves.

2. The method of securing attachments to wire ropes having two or more layers of strands or wires which comprises securing the layers of strands or wires together to cause the layers of strands or wires to work in unison in sustaining strains on the attachment, forming shear lugs on the exterior of the rope, enclosing the rope in an attachment sleeve, and compressing said sleeve to cause the material thereof to flow into the shear lugs and rope grooves.

3. The method of securing attachments to wire ropes having two or more layers of strands or wires which comprises welding the layers of strands or wires together at the end of the rope, enclosing the rope and said welded end in an attachment sleeve, and compressing said sleeve to cause the material thereof to flow into the rope grooves.

4. The method of securing attachments to wire ropes having two or more layers of strands or wires which comprises welding the layers of strands or wires together at the end of the rope, forming shear lugs on the exterior of the rope, enclosing the rope and said welded end in an attachment sleeve, and compressing said sleeve to cause the material thereof to flow into the shear lugs and the rope grooves.

5. A wire rope attachment comprising holding means securing together the layers of wires forming a multi-layer rope to act in unison in sustaining strain on the rope, and an attachment sleeve enclosing the rope and compressed thereon to hold the sleeve by a portion of its metal filling the rope grooves.

6. A wire rope attachment comprising holding means securing together the layers of wires forming a multi-layer rope to act in unison in sustaining strains on the rope, shear lugs formed on the rope exterior, and an attachment sleeve enclosing the rope and the holding means compressed thereon to secure the sleeve by a portion of its metal filling the shear lugs and the rope grooves.

7. A multi-layer wire rope attachment comprising a portion at the rope end having the layers welded together, and an attachment sleeve enclosing the rope and compressed thereon to secure the sleeve by a portion of its metal filling the rope grooves.

8. A multi-layer wire rope attachment comprising a portion at the rope end having the layers welded together, shear lugs formed in the rope exterior, and an attachment sleeve enclosing the rope and compressed thereon to secure the sleeve by a portion of its metal filling the shear lugs and rope grooves.

RICHARD DUANE GREEN.
ARCHIBALD J. MORGAN.